US011310184B1

(12) United States Patent
Byza et al.

(10) Patent No.: US 11,310,184 B1
(45) Date of Patent: Apr. 19, 2022

(54) COMMUNICATION RESPONSE ANALYZER

(71) Applicant: Microsoft Technology Licensing, LLC, Redmond, WA (US)

(72) Inventors: Christian Wilhelm Kurt Byza, San Francisco, CA (US); Jeffrey William Pasternack, Fremont, CA (US); Haowen Ning, Sunnyvale, CA (US); Pujita Mathur, San Francisco, CA (US); Yizhou Pan, San Francisco, CA (US); Ngoc M. Vu, San Francisco, CA (US); Akshaya Subbaraya Bhat, San Francisco, CA (US); Arya Ghatak Choudhury, Sunnyvale, CA (US); Jia Liu, Sunnyvale, CA (US); Neil Cruz Pomerleau, Mountain View, CA (US); Howard Mario Narvaez, Milpitas, CA (US); Kelly K. Hosokawa, Alameda, CA (US); Ryan A. Espiritu, Los Altos, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 63 days.

(21) Appl. No.: 17/039,066

(22) Filed: Sep. 30, 2020

(51) Int. Cl.
*H04L 51/18* (2022.01)
*G06F 3/0481* (2022.01)
(Continued)

(52) U.S. Cl.
CPC ............ *H04L 51/18* (2013.01); *G06F 3/0481* (2013.01); *G06F 3/04842* (2013.01);
(Continued)

(58) Field of Classification Search
None
See application file for complete search history.

(56) References Cited

U.S. PATENT DOCUMENTS

| 2016/0173436 A1* | 6/2016 | Koolwal | G06Q 50/01 709/206 |
| 2016/0191446 A1* | 6/2016 | Grol-Prokopczyk | H04L 51/02 709/206 |
| 2016/0255034 A1* | 9/2016 | Yuan | H04L 51/22 709/206 |

FOREIGN PATENT DOCUMENTS

| WO | WO-2019104336 A1 * | 5/2019 | ............. H04L 51/12 |
| WO | WO-2019112862 A1 * | 6/2019 | ........... H04L 67/306 |
| WO | WO-2020027936 A1 * | 2/2020 | ............. G06N 20/00 |

* cited by examiner

*Primary Examiner* — Jeffrey R Swearingen
(74) *Attorney, Agent, or Firm* — Schwegman Lundberg & Woessner, P.A.

(57) ABSTRACT

Methods are presented for classifying responses to communications. One method includes presenting, in a first user interface (UI), a message from a sender to a recipient requesting a response. The first UI includes response options of a first classification, a second classification, and an entry field for entering a free text message. Another operation is for receiving a recipient response with a selection of: (a) the first or the second button and (b) the free text message entered in the text entry field. The method further includes generating a featurized recipient response based on the free text message and the selection. An acceptance machine-learning (ML) model calculates a classification value of the recipient response from a set of possible classification values based on the featurized recipient response. The method further includes presenting, in a second UI for the sender, an indicator for the message and the calculated classification value.

20 Claims, 10 Drawing Sheets

(51) Int. Cl.
*G06N 5/04* (2006.01)
*G06F 40/30* (2020.01)
*G06N 20/00* (2019.01)
*G06F 3/04842* (2022.01)

(52) U.S. Cl.
CPC ............... *G06F 40/30* (2020.01); *G06N 5/04* (2013.01); *G06N 20/00* (2019.01)

- PRIOR ART -

200

< Jim Smith ...

RECRUITER

LinkedIn
INTERNET – 10,000+ EMPLOYEES
3 CONNECTIONS WORK HERE

204

Jim Smith 11:15PM

Tired of the same routine?

202

HI THERE,

WE'RE REALLY PROUD OF OUR RAPIDLY-GROWING TEAM. WE ARE LOOKING FOR SMART DATA SCIENTISTS THAT WANT TO IMPACT THIS WORLD. LET US KNOW IF YOU WOULD LIKE TO CHAT ABOUT OUR OPENINGS.

BEST
LAURA PATTERSON

WOULD YOU LIKE TO LEARN MORE?

| Not now | Yes |
| 206 | 207 |

FIG. 2
- PRIOR ART -

COMMUNICATION RESPONSE ANALYZER

TECHNICAL FIELD

The subject matter disclosed herein generally relates to methods, systems, and machine-readable storage media for utilizing artificial intelligence to interpret people's responses.

BACKGROUND

In some systems for person-to-person electronic communications, the distributed communication includes a request and the system will prompt the recipient to respond to the sender. Sometimes, the system provides the recipient with a finite set of options for responding (e.g., yes, no, I don't know).

In some cases, the sender sends the request to many users and an online service will analyze and categorize the responses, so the sender is able to quickly assess the responses from users, for example, to select the users for further interactions. If the online service is able to improve the categorization of the responses, overall system efficiency and operations are improved. Being able to quickly assess the responses can greatly increase the productivity of the sender.

However, sometimes the system options provided to the recipient do not include the best response option (e.g., I'm not interested, but my friend Joe would be). Other times, the recipient may select a response option and later wish to select a different option, but there is no method to change the response. Further, some users may wish to expand their response options, but this is difficult to do when only predefined canned options are available via the system.

In some cases, the recipient may be given the option of entering free text as a response, but this may complicate the ability of the system to interpret the message for the sender, particularly where the sender is interested in categorization of only a finite set of options (e.g., yes or no).

What is needed is a system that allows a user flexible options for responding to a message, and also can efficiently categorize and analyze the responses from users in order to allow a message sender to prioritize follow-up activities.

BRIEF DESCRIPTION OF THE DRAWINGS

Various of the appended drawings merely illustrate example embodiments of the present disclosure and cannot be considered as limiting its scope.

FIG. 2 is a user interface for responding to a communication where the recipient must categorize the response and may optionally add additional free text.

DETAILED DESCRIPTION

Figure 1:
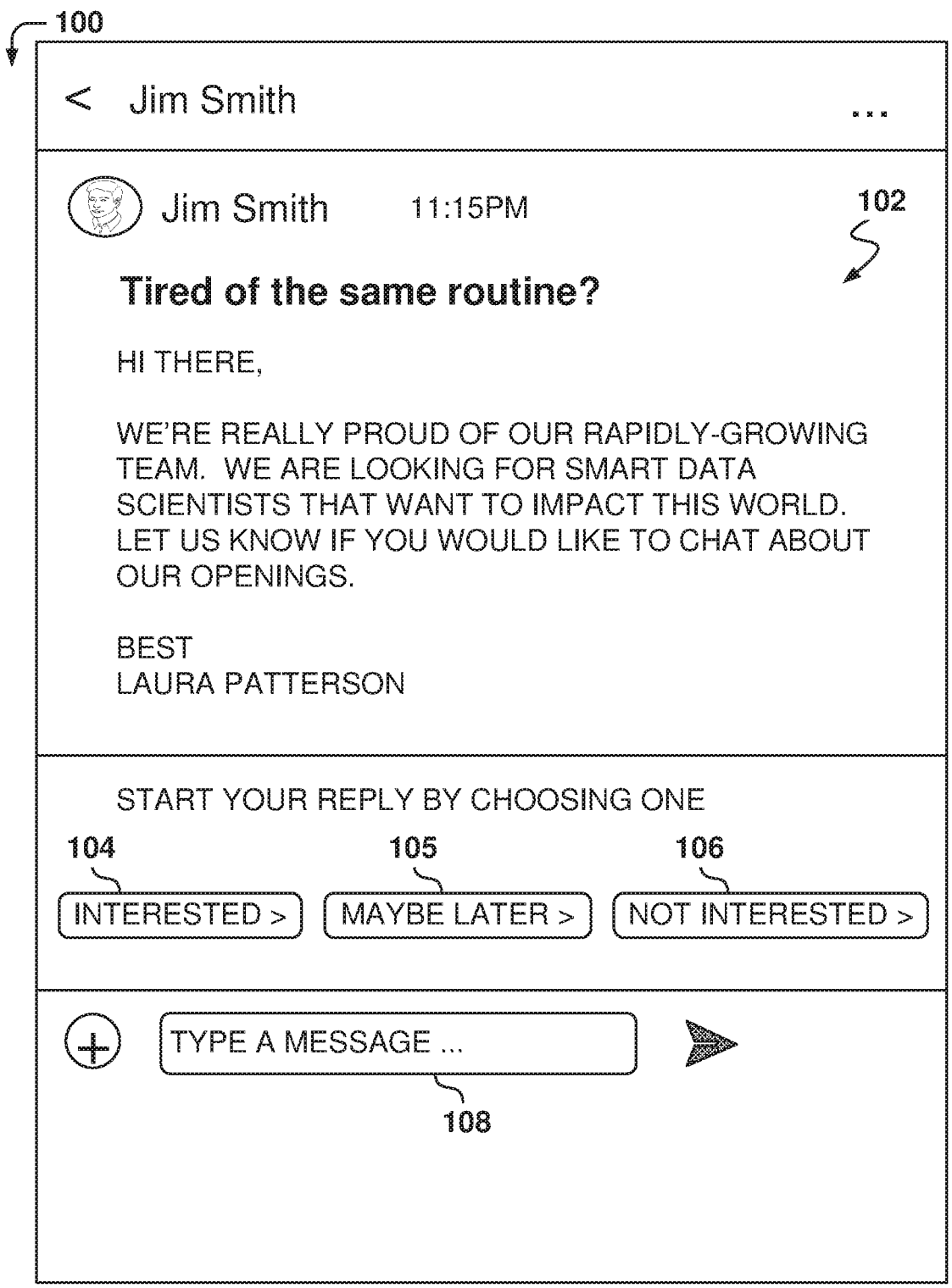
FIG. 1 is a user interface for responding to a request where the recipient must categorize the response.

Example methods, systems, and computer programs are directed to interpreting recipient responses to communications in order to classify and present the responses to the sender. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

A system enables a sender to interact with many recipients of communications, and each communication includes a proposal for the recipient and a request for further interaction if the recipient is interested. The system gives each recipient the option to select from one of multiple choices (e.g., select the button that corresponds to the selected choice), enter text for the response, or a combination thereof. The system analyzes the selections from the recipients and categorizes them in one of multiple categories (e.g., interested or not interested). The system then presents the responses in a user interface with the category selected clearly marked, enabling the sender to quickly assess the intent of each recipient without having to read each of the responses.

In one aspect, the sender is a recruiter that sends communications to candidates for job openings, where the candidates are users or members of an online service. Each communication provides information about a job opening and the recipient is asked to respond if there is interest in the presented job opening. Although embodiments are presented with reference to messages from recruiters, the same system may be utilized for other types of communications where a response is requested, such as marketing communications, offers to buy or sell, offers to volunteer in an activity, surveys, requests for donations, market research, etc.

Methods are presented for interpreting recipient responses to communications in order to classify the responses. One method includes presenting, in a first user interface (UI), a message from a sender to a recipient that requests a response from the recipient. The first UI includes response options of a first classification, a second classification, and a text entry field for entering a free text message. Another operation is for receiving a recipient response that includes a selection of: (a) the first button or the second button and (b) the free text message from the recipient entered in the text entry field. The method further includes generating a featurized recipient response vector (e.g., a vector for the entered text and the button selection, if any) based on the free text message. An acceptance machine-learning (ML) model calculates a classification value of the received free text message from a plurality of classification values based on the featurized recipient response vector. The method further includes presenting, in a second UI for the sender, an indicator for the message and the calculated classification value.

For the purposes of this description the phrases "an online social networking application," "an online social network system," and "an online social network service" may be referred to as and used interchangeably with the phrase "an online social network" or merely "a social network." It will also be noted that an online social network may be any type of an online social network, such as, e.g., a professional network, an interest-based network, or any online networking system that permits users to join as registered members. For the purposes of this description, registered members of an online social network may be referred to as simply members. Further, some online services provide services to their members (e.g., search for jobs, search for candidates for jobs, job postings) without being a social network, and the principles presented herein may also be applied to these online services.

It is noted that the embodiments are presented within a recruiting context where a recruiter sends messages to potential candidates. However, the same methods may be used for any type of communication where a response is requested, such as invitations to connect in an online service, offers for sale, invitations to participate in events, invitations to join a group at work, invitations to volunteer, etc. The embodiments illustrated should therefore not be interpreted to be exclusive or limiting, but rather illustrative.

FIG. 1 is a user interface 100 for responding to a request. In the illustrated example, a recruiter has sent a message 102 to a potential candidate, and the user interface 100 is presented to the potential candidate, also referred to herein as the recipient, with predefined options for responding 104-106.

In some examples, the recipient is asked to begin by selecting one of the predefined options in buttons 104-106 that open a dialog (e.g., a text box with text that is sent upon selection by the recipient). The recipient has the option to enter a text message in input field 108. The recipient does not have to enter the text message, it is optional if the recipient wants to further qualify one of the predefined options.

In this example, there are three options: interested, maybe later, and not interested. In some example cases, the response is presented to the sender and classified as interested or not interested, which allows the sender to sort quickly through a large number of responses.

However, during experiments, it has been found that recipients tend to provide an unusually high number of "interested" responses (also referred to herein as accepted), e.g., 90% of the responses are "interested." The reason may be that some recipients were not really interested, or not very interested, but the recipients wanted to sound polite and not give an apparent rejection. In this example, the classification selected is the one that is reported to the sender, even if the recipient enters text in input field 108 that contradicts the button selection.

For the sender, these responses provide little value, because the responses are not very discriminating. The sender has to read each response to determine if the recipient is really interested, or the recipient is just being polite or is trying to convey some other information, such as "I am not interested but my friend Carla would be."

FIG. 2 is a user interface 200 for responding to a communication where the recipient must categorize the response. The user interface 200 is a communication from a sender to a potential candidate for a job post. Frame 204 provides information about the company looking for candidates for the specific job. The message 202 is sent by the sender to the recipient.

In some examples, the recipient is given two or more options to respond, and the recipient has to make an explicit selection from one of the options to respond since there is no availability for entering plain text as the response.

In the illustrated example in user interface 200, two options are provided: not now and yes. In other examples, additional options might be provided (e.g., maybe, interested in the future, interested in another job post from the same company).

It has been observed that some recipients may not be satisfied with the options given and not respond, even though there may be some interest for the job post or for the jobs from the same company.

During experimentation, it was observed that the number of accept replies from recipients was lower than in the user interface of FIG. 1. However, the accept responses received were of a higher quality because the accept responses signaled real interest from the recipient. This allowed the sender to follow up for further conversation with the recipients that accepted the requests.

However, the problem with user interface 200 is that the number of options are limited, and many recipients felt that the response they wanted to give was not represented in one of the options (e.g., I am not but I know someone that is interested, I am not interested in the data-scientist job but I am interested in the software-developer job).

In the example of FIG. 2, the system does not intelligently categorize the response. If the recipient provides a classification (e.g., button selection), then that is the value presented to the sender, even though the classification may not match the intent of the recipient based on the typed text message.

Figure 3:
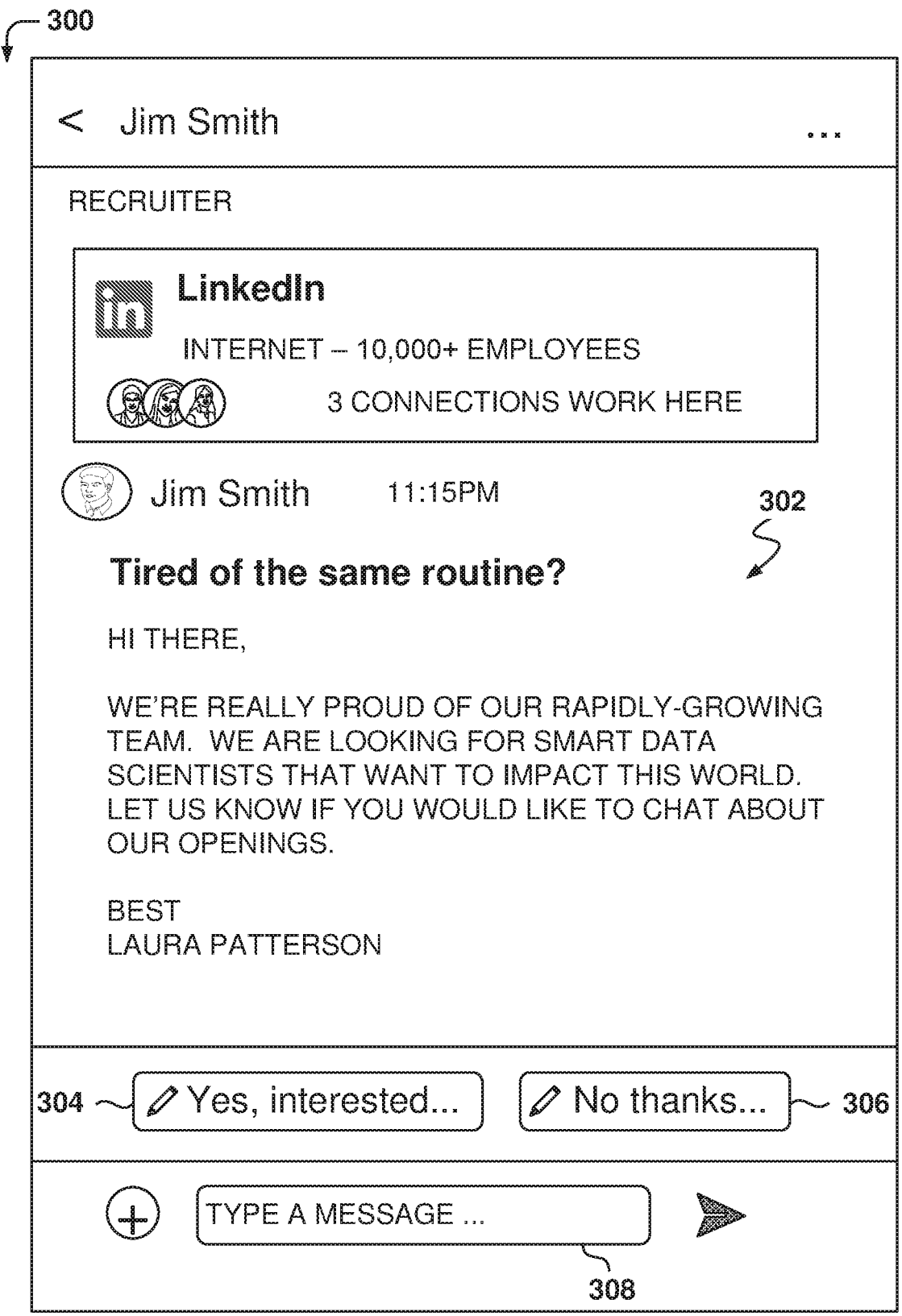
FIG. 3 is a versatile user interface where the recipient has options to select from predefined answers or entering a custom response, according to some example embodiments.

FIG. 3 is a versatile user interface 300 for a system solving the problems explained above with respect to FIGS. 1 and 2, where the recipient has options to: select from predefined answers; enter a custom response without selecting a predefined answer; or enter both a predefined answer and the textual custom response, according to some example embodiments. The message 302 invites the recipient to respond if the recipient is interested in the offer presented.

In some example embodiments, the recipient has the option to select one of the predefined options 304, 306, or enter a free text response in response text 308. That is, the recipient can select one of the buttons for the predefined options 304, 306, but the recipient is not forced to select and can opt to just enter free text for the response.

By given the recipient the flexibility to select one of the options or enter text, the recipient is able to better choose how to respond to the invitation. This results in better communications from recipients and increased user satisfaction.

However, it is important for the system to be able to intelligently and correctly classify incoming responses. Message senders prefer to quickly know if the recipient is interested in the offer but reading answers in text form takes more time than simply looking at an indicator summary, such as accepted or rejected. In some example embodiments, the system analyzes both the selected categorization (if any) and the free text response to classify the response from a predefined number of possibilities (e.g., accepted or not accepted, interested or not interested).

In some example embodiments, the free text is classified from one of the options 304, 306 provided in the user interface. It is noted that the system provides the option to the recipient to enter the free text response without having to previously select one of the predefined options 304, 306. This provides maximum flexibility to the recipient when entering the response.

In other example embodiments, the response (either selection of one of the predefined options or free text, or a combination thereof) is classified according to a predefined number of options, which may be the same or different from the options provided in the buttons. For example, if three options are presented to the recipient, one of the options may be associated with an acceptance, and the other two options may be associated with a rejection.

Sometimes, the recipient may select one of the predefined options, but the text may indicate a different intention (e.g., the recipient selects "Interested," although the recipient is interested for some time in the future but not at the present time). The system will then select a classification that matches the recipient intention and not necessarily the predefined option selected, that is, the system will not use the classification indicated by the recipient by selecting one of the buttons, instead using the classification described in the text based upon the system analysis.

Other embodiments may utilize different layouts, different number of predefined answers, different predefined answers, etc. The embodiments illustrated in FIG. 3 should therefore not be interpreted to be exclusive or limiting, but rather illustrative.

Figure 4:
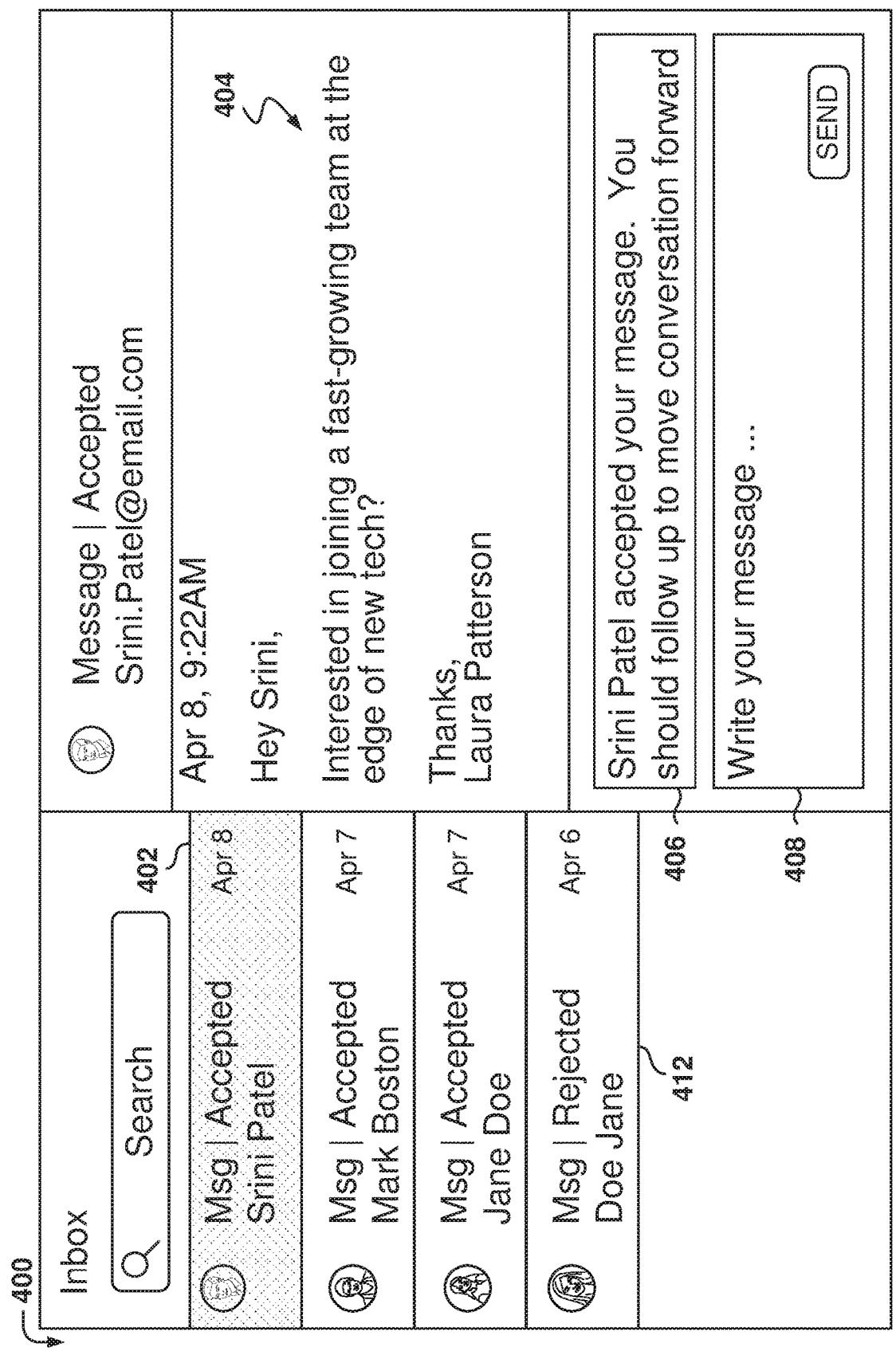
FIG. 4 is a user interface for a sender where the responses from recipients are automatically categorized, according to some example embodiments.

FIG. 4 is a user interface 400 for a recruiter where the responses from recipients are categorized according to the intent of the recipients, according to some example embodiments. On the left of the user interface 400, the responses 402, 412 from recipients are presented in a list.

In some example embodiments, each recipient response is automatically categorized by the system from one of multiple choices. In the illustrated example in FIG. 4, the options are "accepted" and "rejected," but other embodiments may include additional categories. The accepted response 402 is indicative that the recipient that was reached with a possible job offer responded positively to the invitation and is interested in engaging in the recruitment process. The rejected response 412 is indicative that the recipient is not interested in the job described in the invitation.

When the sender selects one of the responses from the list on the left, the content of the response is presented on the right side of the user interface, which includes the original invitation 404, a message 406 indicating that the recipient accepted the invitation (e.g., InMail), and an entry field 408 for sending a new message to the user.

In some example embodiments, filters are provided to the sender for the recipient responses, such as a filter to present only the accepted invitations. This way, the sender does not have to waste time with the recipients that rejected the invitation. For example, a sender may have 100 open invitations and receive 30 accepts and 70 rejections. The sender is able to quickly focus on the accepts and not waste time with the rejections.

In some example embodiments, the sender has two folders: one folder for the accepts and one folder for the rejections. The sender can open the accepts folder to quickly view the responses.

Presenting in such a clear manner the intent of the recipients with regard to the invitation, allows the sender to save time by quickly focusing on high-quality recruits that are interested in continuing the recruiting process.

Figure 5:
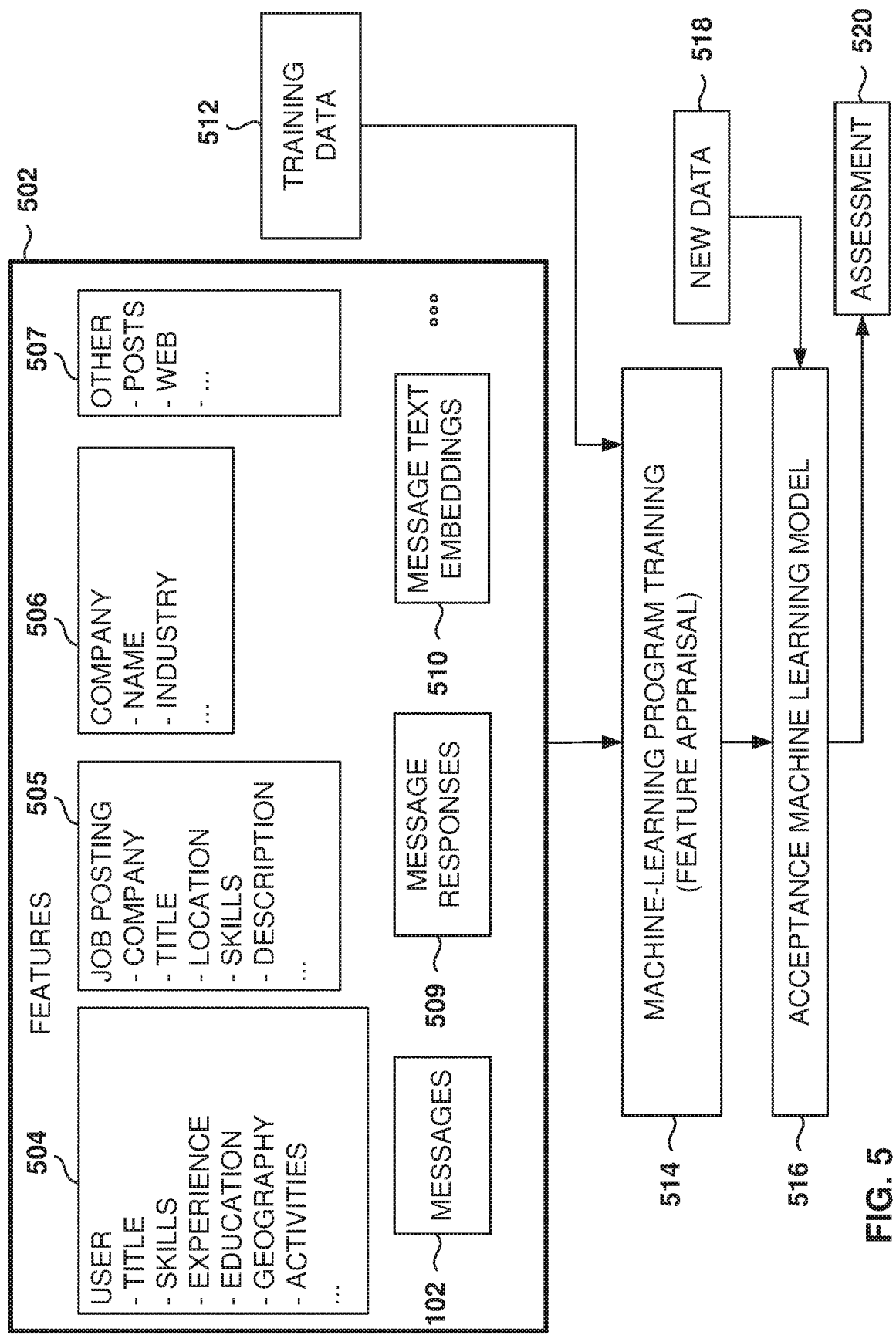
FIG. 5 illustrates the training and use of a machine-learning program, according to some example embodiments.

FIG. 5 illustrates the training and use of a machine-learning program, according to some example embodiments. In some example embodiments, machine-learning programs (MLP), also referred to as machine-learning algorithms or tools, are utilized to perform operations associated with searches, such as job searches.

Machine learning is a field of study that gives computers the ability to learn without being explicitly programmed. Machine learning explores the study and construction of algorithms, also referred to herein as tools, that may learn from existing data and make predictions about new data. Such machine-learning tools operate by building a model from example training data 512 in order to make data-driven predictions or decisions expressed as outputs or assessments 520. Although example embodiments are presented with respect to a few machine-learning tools, the principles presented herein may be applied to other machine-learning tools.

In some example embodiments, different machine-learning tools may be used. For example, Logistic Regression (LR), Naive-Bayes, Random Forest (RF), neural networks (NN), deep neural networks (DNN), matrix factorization, and Support Vector Machines (SVM) tools may be used for classifying or scoring job postings.

Two common types of problems in machine learning are classification problems and regression problems. Classification problems, also referred to as categorization problems, aim at classifying items into one of several category values (for example, is this object an apple or an orange?). Regression algorithms aim at quantifying some items (for example, by providing a value that is a real number). The machine-learning algorithms utilize the training data 512 to find correlations among identified features 502 that affect the outcome.

The machine-learning algorithms utilize features 502 for analyzing the data to generate assessments 520. A feature 502 is an individual measurable property of a phenomenon being observed. The concept of a feature is related to that of an explanatory variable used in statistical techniques such as linear regression. Choosing informative, discriminating, and independent features is important for effective operation of the MLP in pattern recognition, classification, and regression. Features may be of different types, such as numeric, strings, and graphs.

In one example embodiment, the features 502 may be of different types and may include one or more of user features 504 (the user features 504 may include information about the sender and/or the recipient), job-posting features 505; company features 506; Messages 102, Message responses 509, Message text embeddings 510, and other features 510 (user posts, web activity, followed companies, etc.).

The user features 504 include user profile information, such as title, skills, experience, education, geography, activities of the user in the online service, etc. The job posting features 505 include information about job postings, such as company offering the job, title of the job post, location of the job post, skills required, description of the job, etc. Further, the company features 506 include information about the company posting the job, such as name of the company, industry, revenue information, locations, etc.

The messages 102 includes information regarding messages sent from senders to potential candidates. The message responses 509 include information about the responses of the recipients to the messages 102, such as predefined response selected, time of the response, etc. The message text embeddings 510 include information about text responses entered by recipients of the messages. In some example embodiments, the responses of the recipients are embedded into vectors for processing by the ML algorithms.

The ML algorithms utilize the training data 512 to find correlations among the identified features 502 that affect the outcome or assessment 520. In some example embodiments, the training data 512 includes known data, obtained from past activities of senders and recipients in the online system, for one or more identified features 502, such as the responses to the messages sent by the recipients and the classification of the responses (e.g., accepted or rejected) by the sender or by the classification system.

Further, the training data may include information about the messages that did not receive a response from the recipients, e.g., an option classified as "maybe."

With the training data 512 and the identified features 502, the ML algorithm is trained at operation 514. The ML training appraises the value of the features 502 as they correlate to the training data 512. The result of the training is the acceptance ML model 516.

When the acceptance ML model 516 is used to perform an assessment, new data 518 is provided as an input to the acceptance ML model 516, and the acceptance ML model 516 generates the assessment 520 as output. For example, the acceptance ML model 516 may be used to classify a response from a recipient, that has been entered as text, as accepted or rejected. In some example embodiments, additional classification categories may be included.

In some example embodiments, the recipient of the message selects a predefined option (e.g., "Yes, interested," or "No thanks") as well as a free text response. This response input is processed by the acceptance ML model 516 to generate the classification of the response as one from a plurality of predefined values (e.g., "Yes, interested," or "No thanks"). Thus, it is possible that the predefined option selected by the recipient may be overridden and changed to a different category as a result of the automated analysis of the free text response. For example, the free response text indicates that the recipient is not really interested in the offer, but the recipient may not want to sound negative by selecting the "No" option. However, the sender of the communication will find more value from a true classification than having to sort through "polite" positive button selections to find out that a recipient is not really interested.

In other cases, the recipient may not be interested but may select "Yes" because the recipient wants to provide a referral of a friend that may be interested. However, if the sender is not really interested in referrals, such information may prove to be a waste of time. In some example embodiments, the automated categorization may include additional values not provided as explicit recipient options, such as "No, but I know of someone else," "Yes, but not at this time," "No, but maybe later," etc. Thus, these categorizations will allow the sender to traverse the responses quickly without having to read the response text.

Figure 6:
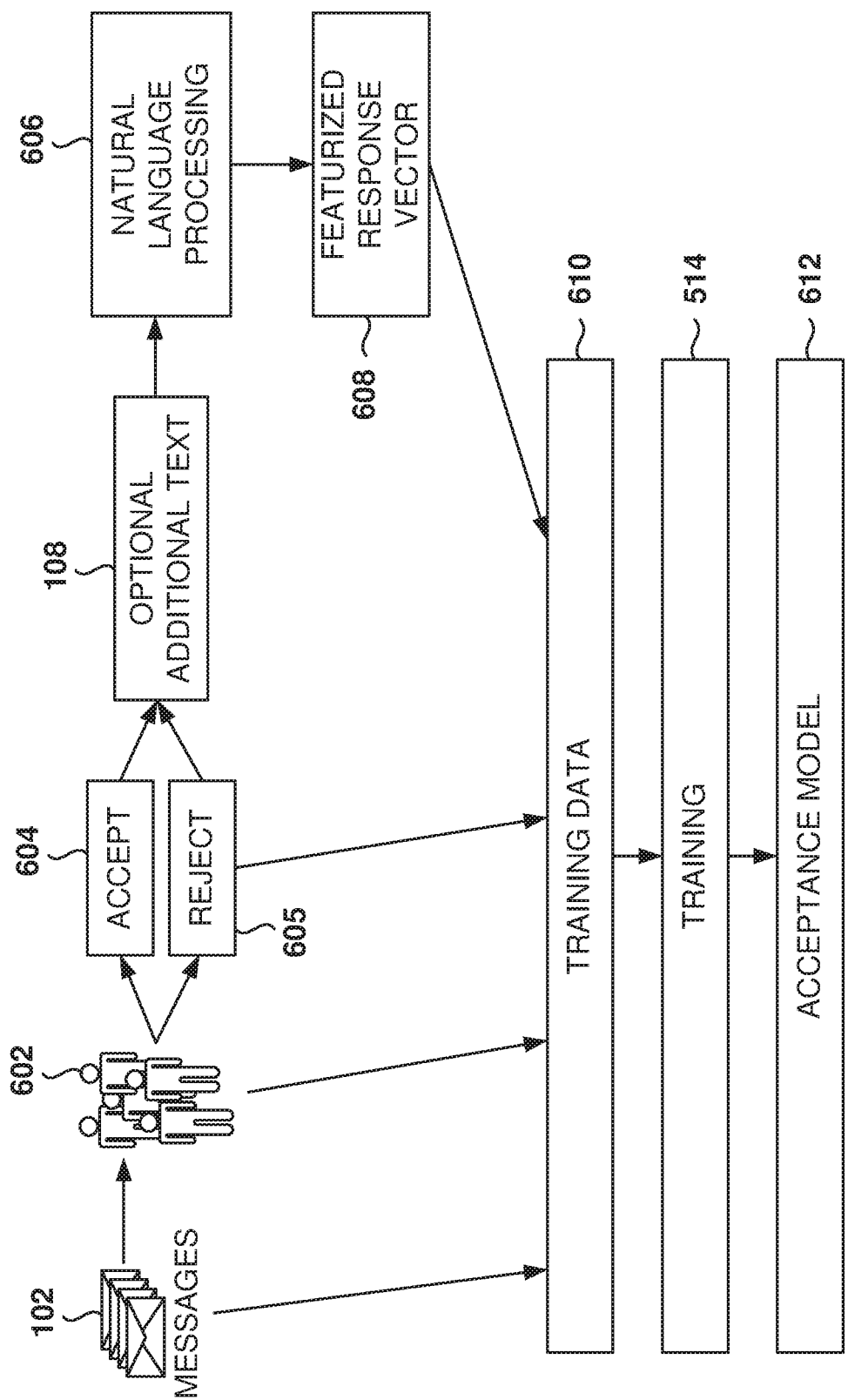
FIG. 6 illustrates the process of getting the training data for the acceptance model, according to some example embodiments.

FIG. 6 illustrates a process for obtaining the training data for the acceptance model, according to some example embodiments. Messages 102 are sent to recipients 602. Each recipient 602 is giving a binary option to accept 604 or reject 605 the invitation to apply for a job. In other example embodiments, additional options or different options may be provided to the recipient.

After the recipient has selected a response to the message 102, the recipient 602 is given the input field 108 to enter additional text for the response. If the recipient enters text, the text is analyzed 606 by a natural language processor that creates a featurized representation vector 608 of the text for use with the model, where the featurized response vector 608 is an expression of the text for the features identified in the model, such as a vector that is created from the text and that can be used as training data or for input to the acceptance model. In other example embodiments, a matrix is used to create the featurized representation of the optional additional text 108 (e.g., representing each word in the text as one row of the matrix). In some example embodiments, the featurized response vectors 608 is a vector representing the text of the response, such as by assigning a vector to each word in the text, and then combining the word vectors, such as by creating a matrix, adding the vectors, concatenating the vectors, etc. In some example embodiments, the featurized response vector 608 is an embedding of the response text, wherein the embedding is a vector with a semantic representation of the text, such that embedded vectors for text with the similar meaning will be close to each other, while embedded vectors for text with a dissimilar meaning will not be close to each other.

Natural language processing (NLP) is a subfield of linguistics, computer science, information engineering, and artificial intelligence concerned with the interactions between computers and human languages, and particularly, how to program computers to process and analyze large amounts of natural language data. Challenges in natural language processing frequently involve speech recognition, natural language understanding, and natural language generation.

Training data 610 is then created with information regarding the messages 102, recipients 602 (e.g., user profile data, recipient activities related to job applications for message responses), the response (accept 604 or reject 605) to the message, and feature representation vectors 608 of the texts when available.

Since the recipients have to select accept 604 or reject 605, all the responses are classified, because the recipients 602 have provided that classification. Further, the optional additional text 108 provides information that matches text responses to the classification provided by the recipients 602. This provides a clear one-to-one mapping between what the recipient selected choice and the response they typed. This provides an initial set of training data 610 for the system. Over time, as the model is refined and as additional data is gathered by the system (e.g., information from recipients on the proper classification of responses), then this newer information will be used to improve the accuracy of the training data 610.

In some example embodiments, the training data 610 includes the recipient classification for the responses and the text entered by recipients that provided the responses, and the ML algorithm is a shallow neural network. In other example embodiments, additional features may be included, such as the ones described with reference to FIG. 5.

In some example embodiments, the training data 610 may be refined by requesting confirmation from the recipient 602 or the sender. For example, once the recipient enters a textual response, the recipient is prompted, "We believe that you are interested in pursuing this opportunity, yes or no?" The response may then be used to improve the training data.

Similarly, when a sender is reviewing a response, the sender may be prompted with information regarding the estimated classification, such as, "We believe that this candidate is interested in pursuing this opportunity, yes or no?" The response may then be used to improve the training data. For example, if the classification was incorrect, the training data is amended to reflect this incorrect classification.

At operation 514, the training data 610 is used to create an acceptance model 612, as described above with reference to FIG. 5. In some example embodiments, the acceptance model 612 is a classifier to determine if the response is an accept or a reject. In other example embodiments, the acceptance model 612 provides a score or probability of an acceptance (e.g., 75% probability that the response is an acceptance, and 25% probability of a rejection).

Figure 7:
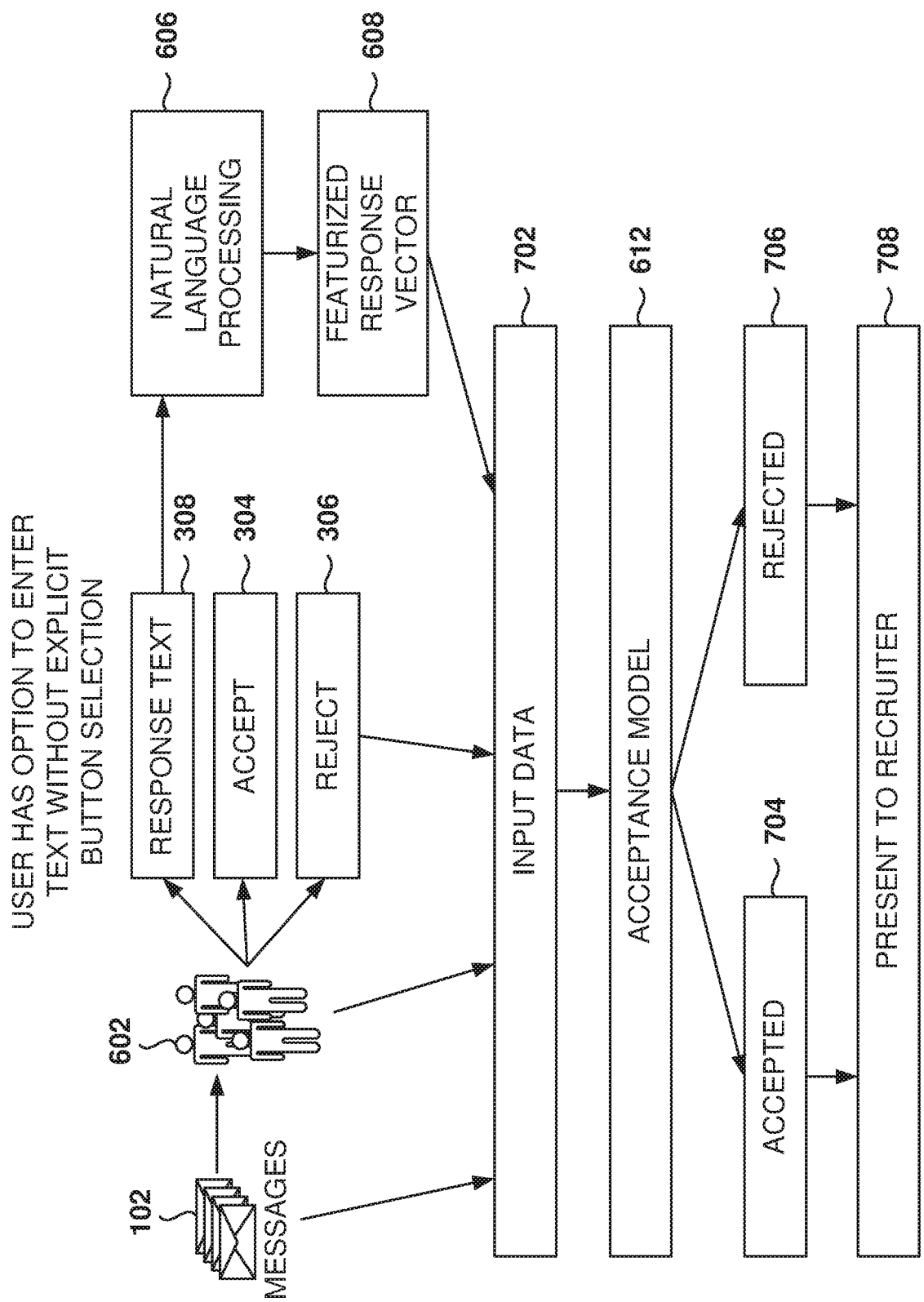
FIG. 7 illustrates the use of the acceptance model to categorize recipient responses, according to some example embodiments.

FIG. 7 illustrates the use of the acceptance model 612 to categorize recipient responses, according to some example embodiments. In the illustrated example, the user interface described with reference to FIG. 3 is presented to the recipients 602 that received the messages 102, that is, the recipients can respond with a response text 308, an accept 304, a reject 306, or a combination of response text 308 with one of accept 304 or reject 306.

When the recipient enters a response text, natural language processing 606 creates a feature representation vector 608 of the text based on the content of the response text 308.

Information from one or more of the messages 102, recipients 602, response text 308, accept 304 or reject 306, and feature representation vector 608 of the text, is used as input data 702 for the acceptance model 612.

The acceptance model 612 then provides an output indicating if the response from one recipient 602 to a given message 102 is an acceptance 704 or a rejection 706. The categorization is then presented on a user interface, such as the user interface 400 presented in FIG. 4. It is noted that the output of the acceptance model 612 is not necessarily equal to the selection of one of the predefined options by the recipient, as the acceptance model 612 may "re-classify" the response based on the response text 308.

In some example embodiments, the responses provided by the recipients 602 may be used to enhance other functions in the online service besides sender communications. For example, the system measures the frequency at which a recipient responds to messages. If the recipient is responding often with acceptances often, this is a signal that the recipient is interested in changing jobs. This information is then provided to the utility that sorts candidates, such that candidates that are more inclined to change jobs will see their ranking, within the list of candidates for a job, boosted based on their desire to change jobs.

Further, when senders search for candidates, the candidate-search function utilizes the indication that the recipient is willing to change jobs as one of the features for a machine-learning model, where recipients willing to change jobs will see their scores increased.

In other example embodiments, the online service analyzes the acceptances of a particular recipient to check for the parameters of the job offerings, such as title, skills, industry, company, etc. This may be used by a job-search function (e.g., Jobs You May Be Interested In (JYMBI)), to find jobs for the recipient that matches the identified desired job characteristics.

Figure 8:
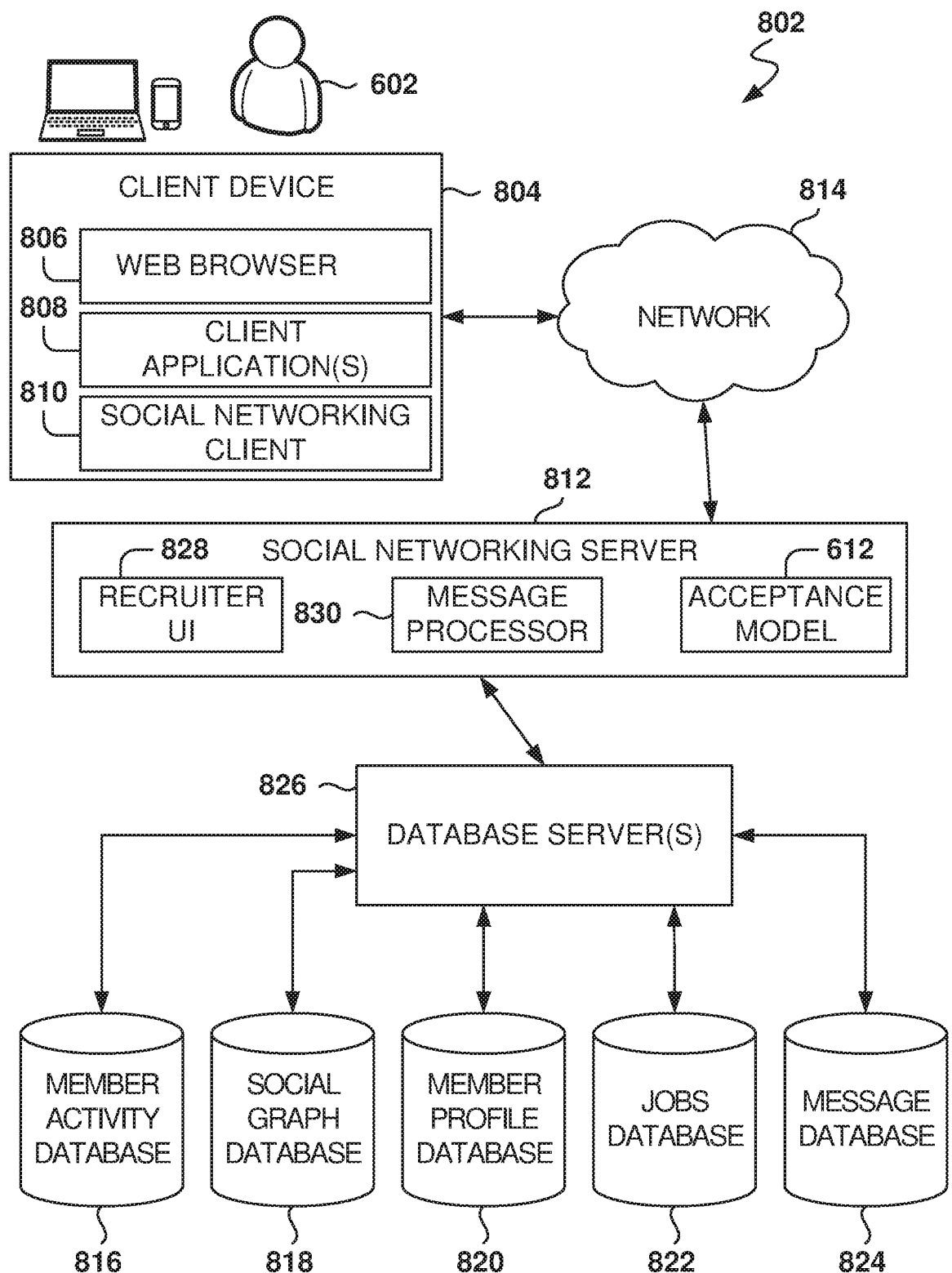
FIG. 8 is a block diagram illustrating a networked system, according to some example embodiments, illustrating an example embodiment of a high-level client-server-based network architecture.

FIG. 8 is a block diagram illustrating a networked system, according to some example embodiments, including a social networking server 812, illustrating an example embodiment of a high-level client-server-based network architecture 802. Embodiments are presented with reference to an online service and, in some example embodiments, the online service is a social networking service.

The social networking server 812 provides server-side functionality via a network 814 (e.g., the Internet or a wide area network (WAN)) to one or more client devices 804. FIG. 8 illustrates, for example, a web browser 806, client application(s) 808, and a social networking client 810 executing on a client device 804. The social networking server 812 is further communicatively coupled with one or more database servers 826 that provide access to one or more databases 816-224.

The social networking server 812 includes, among other modules, a recruiter user interface (UI) 828, a message processor 830, and an acceptance model 612. The recruiter UI 828 provides the user interface for the recruiter within the online service (e.g., User Interface 400 of FIG. 4). The message processor 830 manages the transmittal of messages to candidates and their responses to the recruiters.

The client device 804 may comprise, but is not limited to, a mobile phone, a desktop computer, a laptop, a portable digital assistant (PDA), a smart phone, a tablet, a netbook, a multi-processor system, a microprocessor-based or programmable consumer electronic system, or any other communication device that a user may utilize to access the social networking server 812. In some embodiments, the client device 804 may comprise a display module (not shown) to display information (e.g., in the form of user interfaces).

In one embodiment, the social networking server 812 is a network-based appliance that responds to initialization requests or search queries from the client device 804. One or more recipients 602 may be a person, a machine, or other means of interacting with the client device 804. In various embodiments, the recipient 602 interacts with the network architecture 802 via the client device 804 or another means.

The client device 804 may include one or more applications (also referred to as "apps") such as, but not limited to, the web browser 806, the social networking client 810, and other client applications 808, such as a messaging application, an electronic mail (email) application, a news application, and the like. In some embodiments, if the social networking client 810 is present in the client device 804, then the social networking client 810 is configured to locally provide the user interface for the application and to communicate with the social networking server 812, on an as-needed basis, for data and/or processing capabilities not locally available (e.g., to access a user profile, to authenticate a recipient 602, to identify or locate other connected recipients 602, etc.). Conversely, if the social networking client 810 is not included in the client device 804, the client device 804 may use the web browser 806 to access the social networking server 812.

In addition to the client device 804, the social networking server 812 communicates with the one or more database servers 826 and databases 816-224. In one example embodiment, the social networking server 812 is communicatively coupled to a member activity database 816, a social graph database 818, a member profile database 820, a job postings database 822, and an message database 824. The databases 816-224 may be implemented as one or more types of databases including, but not limited to, a hierarchical database, a relational database, an object-oriented database, one or more flat files, or combinations thereof.

The member profile database 820 stores user profile information about users who have registered with the social networking server 812. With regard to the member profile database 820, the member may be an individual person or an organization, such as a company, a corporation, a nonprofit organization, an educational institution, or other such organizations.

In some example embodiments, when a recipient 602 initially registers to become a member of the social networking service provided by the social networking server 812, the recipient 602 is prompted to provide some personal information, such as name, age (e.g., birth date), gender, interests, contact information, home town, address, spouse's and/or family users' names, educational background (e.g., schools, majors, matriculation and/or graduation dates, etc.), employment history (e.g., companies worked at, periods of employment for the respective jobs, job title), professional industry (also referred to herein simply as "industry"), skills, professional organizations, and so on. This information is stored, for example, in the member profile database 820. Similarly, when a representative of an organization initially registers the organization with the social networking service provided by the social networking server 812, the representative may be prompted to provide certain information about the organization, such as a company industry.

As members interact with the social networking service provided by the social networking server 812, the social networking server 812 is configured to monitor these interactions. Examples of interactions include, but are not limited to, commenting on posts entered by other members, viewing user profiles, editing or viewing a member's own profile, sharing content outside of the social networking service (e.g., an article provided by an entity other than the social networking server 812), updating a current status, posting content for other members to view and comment on, posting job suggestions for the members, searching job postings, and other such interactions. In one embodiment, records of these interactions are stored in the user activity database 816, which associates interactions made by a member with his or her user profile stored in the user profile database 820.

The job postings database 822 includes job postings offered by companies. Each job posting includes job-related information such as any combination of employer, job title, job description, requirements for the job posting, salary and benefits, geographic location, one or more job skills desired, day the job posting was posted, relocation benefits, and the like. Further, the message database 824 stores messages and responses to messages.

While the database server(s) 826 are illustrated as a single block, one of ordinary skill in the art will recognize that the database server(s) 826 may include one or more such servers. Accordingly, and in one embodiment, the database server(s) 826 implemented by the social networking service are further configured to communicate with the social networking server 812.

Figure 9:
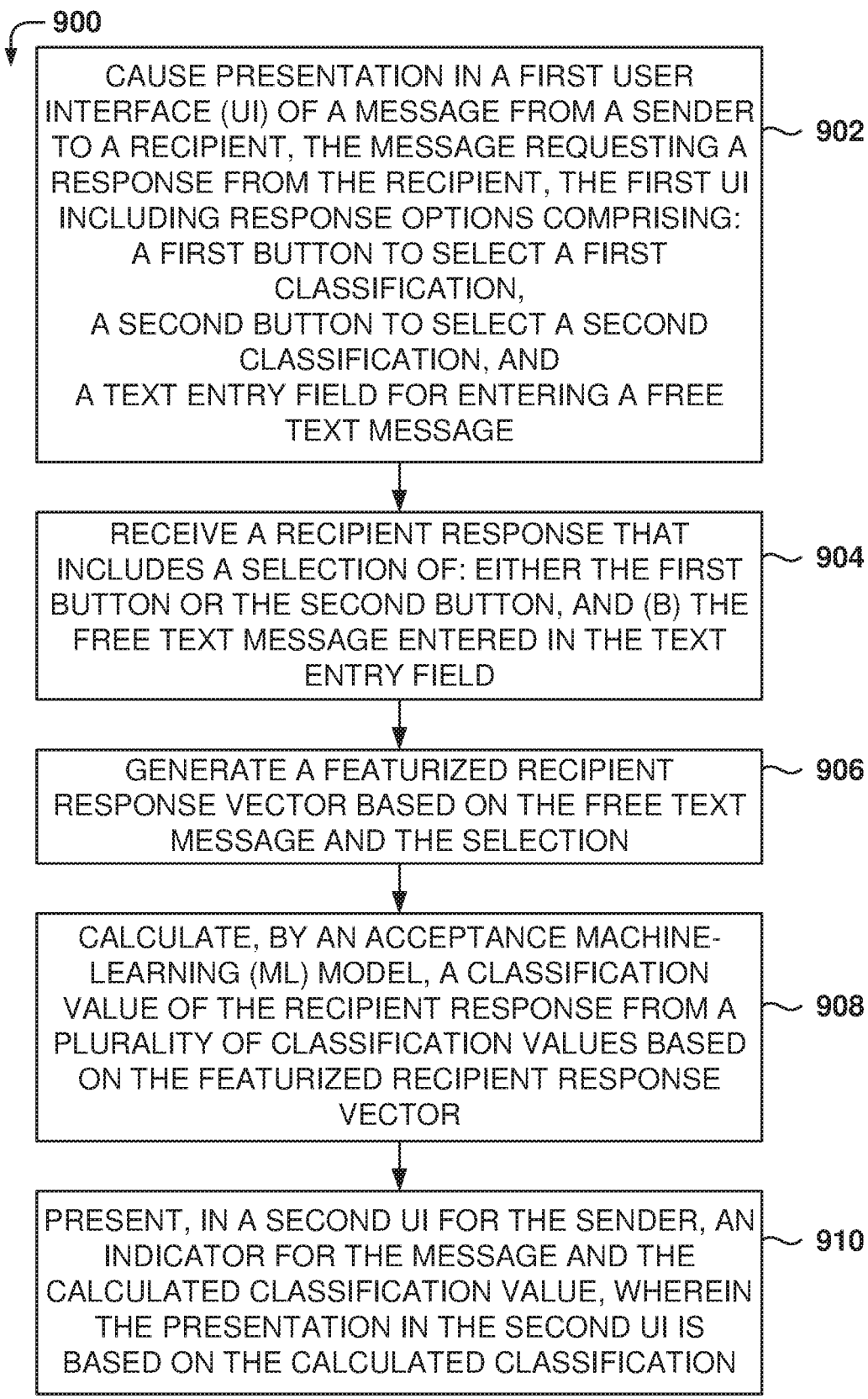
FIG. 9 is a flowchart of a method for classifying recipient responses into one from a finite set of possible response categories, according to some example embodiments.

FIG. 9 is a flowchart of a method 900 for classifying recipient responses into one of a finite set of possible response categories, according to some example embodiments. While the various operations in this flowchart are presented and described sequentially, one of ordinary skill will appreciate that some or all of the operations may be executed in a different order, be combined or omitted, or be executed in parallel.

Operation 902 is for causing presentation in a first user interface (UI) of a message from a sender to a recipient. The message includes a request for a response from the recipient, and the first UI includes the following response options: a first button to select a first classification, a second button to select a second classification, and a text entry field for entering a free text message.

From operation 902, the method 900 flows to operation 904 for receiving a recipient response that includes a selection of: (a) either the first button or the second button and (b) the free text message entered in the text entry field.

At operation 906, a featurized recipient response vector is generated based on the free text message and the selection.

From operation 906, the method flows to operation 908, where an acceptance machine-learning (ML) model calculates a classification value of the recipient response from a plurality of classification values based on the featurized recipient response vector.

From operation 908, the method 900 flows to operation 910 for presenting, in a second UI for the sender, an indicator for the message and the calculated classification value, where the presentation in the second UI is based on the calculated classification.

In one example, the acceptance ML model is generated by an ML program based on training data that includes one or more of: (a) information about recipient responses to requests including text responses and button selections, and (b) classification values of the responses to the requests.

In one example, the method 900 further comprises generating training data based on the recipient responses to requests, the generating the training data comprising: resenting in a third UI a message requesting a response from the recipient; enabling the recipient to select one of the first classification or the second classification; and adding in the training data information about the message requesting the response and the selection by the recipient.

In one example, the acceptance ML model is based on features comprising: the requests to the recipients; the responses to the requests; the text embeddings of the responses to the requests; and the classification value of the responses to the requests.

In one example, the features further comprise one or more of user profile information, information associated with the requests, and information about a company associated with the request.

In one example, generating the featurized recipient response vector comprises: utilizing a natural language processor to generate the featurized recipient response vector based on a semantic meaning of the free text message.

In one example, the first classification is to accept the request and the second classification is to reject the request.

In one example, presenting in the second UI further comprises: providing, in the second UI, a first folder for accepted requests and a second folder for rejected requests.

In one example, the message is a request from a recruiter for an employment opportunity.

In one example, the message is one of an offer of a product for sale, an offer of a service for sale, or a survey.

Another general aspect is for a system that includes a memory comprising instructions and one or more computer processors. The instructions, when executed by the one or more computer processors, cause the one or more computer processors to perform operations comprising: causing presentation in a first user interface (UI) of a message from a sender to a recipient, the message requesting a response from the recipient, the first UI including response options comprising: a first button to select a first classification; a second button to select a second classification; and a text entry field for entering a free text message; receiving a recipient response that includes a selection of: (a) either the first button or the second button and (b) the free text message entered in the text entry field; generating a featurized recipient response vector based on the free text message and the selection; calculating, by an acceptance machine-learning (ML) model, a classification value of the recipient response from a plurality of classification values based on the featurized recipient response vector; and presenting, in a second UI for the sender, an indicator for the message and the calculated classification value, wherein the presentation in the second UI is based on the calculated classification value.

In yet another general aspect, a machine-readable storage medium (e.g., a non-transitory storage medium) includes instructions that, when executed by a machine, cause the machine to perform operations comprising: causing presentation in a first user interface (UI) of a message from a sender to a recipient, the message requesting a response from the recipient, the first UI including response options comprising: a first button to select a first classification; a second button to select a second classification; and a text entry field for entering a free text message; receiving a recipient response that includes a selection of: (a) either the first button or the second button and (b) the free text message entered in the text entry field; generating a featurized recipient response vector based on the free text message and the selection; calculating, by an acceptance machine-learning (ML) model, a classification value of the recipient response from a plurality of classification values based on the featurized recipient response vector; and presenting, in a second UI for the sender, an indicator for the message and the calculated classification value, wherein the presentation in the second UI is based on the calculated classification value.

Figure 10:
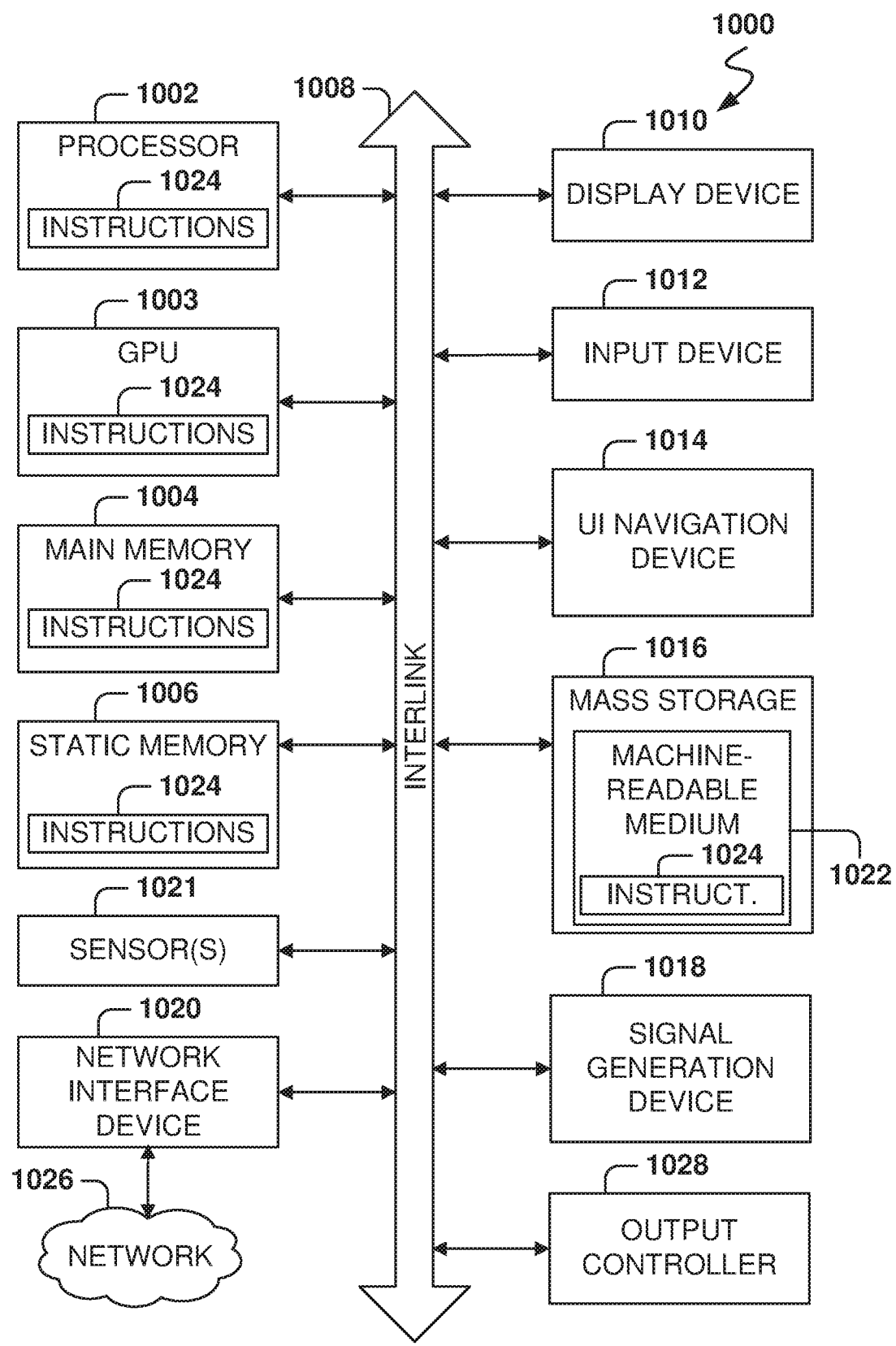
FIG. 10 is a block diagram illustrating an example of a machine upon or by which one or more example process embodiments described herein may be implemented or controlled.

FIG. 10 is a block diagram illustrating an example of a machine 1000 upon or by which one or more example process embodiments described herein may be implemented or controlled. In alternative embodiments, the machine 1000 may operate as a standalone device or may be connected (e.g., networked) to other machines. In a networked deployment, the machine 1000 may operate in the capacity of a server machine, a client machine, or both in server-client network environments. In an example, the machine 1000 may act as a peer machine in a peer-to-peer (P2P) (or other distributed) network environment. Further, while only a single machine 1000 is illustrated, the term "machine" shall also be taken to include any collection of machines that individually or jointly execute a set (or multiple sets) of instructions to perform any one or more of the methodologies discussed herein, such as via cloud computing, software as a service (SaaS), or other computer cluster configurations.

Examples, as described herein, may include, or may operate by, logic, a number of components, or mechanisms. Circuitry is a collection of circuits implemented in tangible entities that include hardware (e.g., simple circuits, gates, logic). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits) including a computer-readable medium physically modified (e.g., magnetically, electrically, by moveable placement of invariant massed particles) to encode instructions of the specific operation. In connecting the physical components, the underlying electrical properties of a hardware constituent are changed (for example, from an insulator to a conductor or vice versa). The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry, at a different time.

The machine (e.g., computer system) 1000 may include a hardware processor 1002 (e.g., a central processing unit (CPU), a hardware processor core, or any combination thereof), a graphics processing unit (GPU) 1003, a main memory 1004, and a static memory 1006, some or all of which may communicate with each other via an interlink (e.g., bus) 1008. The machine 1000 may further include a display device 1010, an alphanumeric input device 1012 (e.g., a keyboard), and a user interface (UI) navigation device 1014 (e.g., a mouse). In an example, the display device 1010, alphanumeric input device 1012, and UI navigation device 1014 may be a touch screen display. The machine 1000 may additionally include a mass storage device (e.g., drive unit) 1016, a signal generation device 1018 (e.g., a speaker), a network interface device 1020, and one or more sensors 1021, such as a Global Positioning System (GPS) sensor, compass, accelerometer, or another sensor. The machine 1000 may include an output controller 1028, such as a serial (e.g., universal serial bus (USB)), parallel, or other wired or wireless (e.g., infrared (IR), near field communication (NFC)) connection to communicate with or control one or more peripheral devices (e.g., a printer, card reader).

The mass storage device 1016 may include a machine-readable medium 1022 on which is stored one or more sets of data structures or instructions 1024 (e.g., software) embodying or utilized by any one or more of the techniques or functions described herein. The instructions 1024 may also reside, completely or at least partially, within the main memory 1004, within the static memory 1006, within the hardware processor 1002, or within the GPU 1003 during execution thereof by the machine 1000. In an example, one or any combination of the hardware processor 1002, the GPU 1003, the main memory 1004, the static memory 1006, or the mass storage device 1016 may constitute machine-readable media.

While the machine-readable medium 1022 is illustrated as a single medium, the term "machine-readable medium" may include a single medium, or multiple media. (e.g., a centralized or distributed database, and/or associated caches and servers) configured to store the one or more instructions 1024.

The term "machine-readable medium" may include any medium that is capable of storing, encoding, or carrying instructions 1024 for execution by the machine 1000 and that cause the machine 1000 to perform any one or more of the techniques of the present disclosure, or that is capable of storing, encoding, or carrying data structures used by or associated with such instructions 1024. Non-limiting machine-readable medium examples may include solid-state memories, and optical and magnetic media. In an example, a massed machine-readable medium comprises a machine-readable medium 1022 with a plurality of particles having invariant (e.g., rest) mass. Accordingly, massed machine-readable media are not transitory propagating signals. Specific examples of massed machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1024 may further be transmitted or received over a communications network 1026 using a transmission medium via the network interface device 1020.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computer-implemented method comprising:
   causing presentation in a first user interface (UI) of a message from a sender to a recipient, the message requesting a response from the recipient, the first UI including response options comprising:
   a first button to select a first classification;
   a second button to select a second classification; and
   a text entry field for entering a free text message;
   receiving a recipient response that includes a selection of:
   (a) either the first button or the second button and (b) the free text message entered in the text entry field;
   generating a featurized recipient response vector based on the free text message and the selection;
   calculating, by an acceptance machine-learning (ML) model, a classification value of the recipient response from a plurality of classification values based on the featurized recipient response vector; and
   presenting, in a second UI for the sender, an indicator for the message and the calculated classification value, wherein the presentation in the second UI is based on the calculated classification value.

2. The method as recited in claim 1, wherein the acceptance ML model is generated by an ML program based on training data that includes one or more of: (a) information about recipient responses to requests including text responses and button selections, and (b) classification values of the responses to the requests.

3. The method as recited in claim 2, further comprising:
   generating training data based on the recipient responses to requests, the generating the training data comprising:
   presenting in a third UI a message requesting a response from the recipient;
   enabling the recipient to select one of the first classification or the second classification; and
   adding in the training data information about the message requesting the response and the selection by the recipient.

4. The method as recited in claim 2, wherein the acceptance ML model is based on features comprising:
   the requests to the recipients;
   the responses to the requests;
   the text embeddings of the responses to the requests; and
   the classification value of the responses to the requests.

5. The method as recited in claim 4, wherein the features further comprise one or more of:
   user profile information;
   information associated with the requests; and
   information about a company associated with the request.

6. The method as recited in claim 1, wherein generating the featurized recipient response vector comprises:
   utilizing a natural language processor to generate the featurized recipient response vector based on a semantic meaning of the free text message.

7. The method as recited in claim 1, wherein the first classification is to accept the request and the second classification is to reject the request.

8. The method as recited in claim 7, wherein presenting in the second UI further comprises:
   providing, in the second UI, a first folder for accepted requests and a second folder for rejected requests.

9. The method as recited in claim 1, wherein the message is a request from a recruiter for an employment opportunity.

10. The method as recited in claim 1, wherein the message is one of an offer of a product for sale, an offer of a service for sale, or a survey.

11. A system comprising:
    a memory comprising instructions; and
    one or more computer processors, wherein the instructions, when executed by the one or more computer processors, cause the system to perform operations comprising:
    causing presentation in a first user interface (UI) of a message from a sender to a recipient, the message requesting a response from the recipient, the first UI including response options comprising:
    a first button to select a first classification;
    a second button to select a second classification; and
    a text entry field for entering a free text message;
    receiving a recipient response that includes a selection of: (a) either the first button or the second button and the free text message entered in the text entry field;
    generating a featurized recipient response vector based on the free text message and the selection;
    calculating, by an acceptance machine-learning (ML) model, a classification value of the recipient response from a plurality of classification values based on the featurized recipient response vector; and presenting, in a second UI for the sender, an indicator for the message and the calculated classification value, wherein the presentation in the second UI is based on the calculated classification value.

12. The system as recited in claim 11, wherein the acceptance ML model is generated by an ML program based on training data that includes one or more of: (a) information about recipient responses to requests including text responses and button selections, and (b) classification values of the responses to the requests.

13. The system as recited in claim 12, wherein the instructions further cause the one or more computer processors to perform operations comprising:
generating training data based on the recipient responses to requests, the generating the training data comprising:
presenting in a third UI a message requesting a response from the recipient;
enabling the recipient to select one of the first classification or the second classification; and
adding in the training data information about the message requesting the response and the selection by the recipient.

14. The system as recited in claim 12, wherein the acceptance ML model is based on features comprising:
the requests to the recipients;
the responses to the requests;
the text embeddings of the responses to the requests; and
the classification value of the responses to the requests.

15. The system as recited in claim 14, wherein the features further comprise one or more of:
user profile information;
information associated with the requests; and
information about a company associated with the request.

16. The system as recited in claim 11, wherein generating the featurized recipient response vector comprises:
utilizing a natural language processor to generate the featurized recipient response vector based on a semantic meaning of the free text message.

17. The system as recited in claim 11, wherein the first classification is to accept the request and the second classification is to reject the request.

18. The system as recited in claim 11, wherein presenting in the second UI further comprises:
providing, in the second UI, a first folder for accepted requests and a second folder for rejected requests.

19. A non-transitory machine-readable storage medium including instructions that, when executed by a machine, cause the machine to perform operations comprising:
causing presentation in a first user interface (UI) of a message from a sender to a recipient, the message requesting a response from the recipient, the first UI including response options comprising:
a first button to select a first classification;
a second button to select a second classification; and
a text entry field for entering a free text message;
receiving a recipient response that includes a selection of: (a) either the first button or the second button and (b) the free text message entered in the text entry field;
generating a featurized recipient response vector based on the free text message and the selection;
calculating, by an acceptance machine-learning (ML) model, a classification value of the recipient response from a plurality of classification values based on the featurized recipient response vector; and
presenting, in a second UI for the sender, an indicator for the message and the calculated classification value, wherein the presentation in the second UI is based on the calculated classification value.

20. The non-transitory machine-readable storage medium as recited in claim 19, wherein the ML model is generated by an ML program based on training data that includes one or more of: (a) information about recipient responses to requests including text responses and button selections, and (b) classification values of the responses to the requests.

* * * * *

UNITED STATES PATENT AND TRADEMARK OFFICE
CERTIFICATE OF CORRECTION

PATENT NO. : 11,310,184 B1
APPLICATION NO. : 17/039066
DATED : April 19, 2022
INVENTOR(S) : Byza et al.

It is certified that error appears in the above-identified patent and that said Letters Patent is hereby corrected as shown below:

On the Title Page

Item (22), in "Filed", in Column 1, Line 1, after "2020", insert
--(65) Prior Publication Data
US 2022/0103504 A1 Mar. 31, 2022--

In the Claims

In Column 17, Line 34, in Claim 15, delete "of;" and insert --of:-- therefor

Signed and Sealed this
Twelfth Day of July, 2022

Katherine Kelly Vidal
*Director of the United States Patent and Trademark Office*